INVENTOR:
FRIEDRICH SCHWAB
BY:

March 20, 1956  F. SCHWAB  2,738,691
TURRET HEAD

Filed Nov. 17, 1953  2 Sheets-Sheet 2

INVENTOR:
FRIEDRICH SCHWAB
BY:

United States Patent Office 2,738,691
Patented Mar. 20, 1956

2,738,691

TURRET HEAD

Friedrich Schwab, Stuttgart-Riedenberg, Germany

Application November 17, 1953, Serial No. 392,722

Claims priority, application Germany November 18, 1952

6 Claims. (Cl. 77—25)

The present invention relates to improvements in turret heads, and more particularly to a turret head for a drill press or similar machine consisting of an upper section or housing to be fitted to the spindle of the machine and a lower section carrying the tool heads and rotatable in or on the upper section about an axis which is inclined relative to the machine spindle.

Whereas the known turret heads of the above mentioned type have the disadvantage that the tool spindles in the various tool heads can only run at one and the same speed, it is the principal object of the present invention to devise a turret head for a drill press or similar machine, the individual tool heads of which may be driven at different speeds without requiring any adjustment of the machine spindle and without requiring the time and effort usually needed for such adjustment. Thus, the invention permits the use of tools in the same turret head or even in the same tool head which require different speeds of operation, such as, for example, drills of various diameters, reamers, taps, countersinks, and the like.

Another object of the invention is to devise a turret head wherein the tool heads are mounted so as to be easily secured thereto or removed therefrom, so that either tool heads with or without a built-in speed changing gear may be used therein.

A feature of the invention for carrying out the above objects consists in providing the tool heads with a shell-like casing wherein a plurality of work spindles may be mounted so as to be either directly connected to the driving spindle or through an intermediate speed changing gear.

Another feature of the invention for using a variety of different tools in the same tool head consists in providing the same with a multispeed gear so as to permit the work spindle to be adjusted to different speeds.

A further feature of the invention resides in a very simple and inexpensive design of the turret head wherein the lower part thereof may consist of a substantially flat plate and socket therein for receiving the tool heads.

More specifically, it is a feature of the invention to provide a turret head, the lower part of which can be rotated by the drive spindle in a very simple manner by connecting it to the spindle by means of a suitable gear such as, for example, a friction gear provided with a suitable clutch. Such a design of the turret head and the driving mechanism of the lower part thereof permits such part to be easily exchanged for another of a different kind and with a different number of sockets for receiving the tool heads.

Consequently, it is an additional feature of the invention to design the said lower part of the turret head so as to be easily and quickly connectable with, or removable from, the upper part thereof, for example, by means of a quick-change coupling and a bayonet ring or the like.

Another feature of the invention is provided for the purpose of automatically adjusting the tool heads to their proper position coaxially with the drive spindle before being connected thereto, and it preferably consists of a centering mechanism for the mentioned clutch.

A further feature of the invention consists in means for facilitating the connection of the work spindle to the drive spindle by synchronizing their movements prior to their engagement with each other. For this purpose, the invention provides within the drive spindle of the turret head a suitable accelerating shaft which projects beyond the clutch part of the drive spindle of the turret head and is non-rotatable relative thereto but slidable in axial direction thereof against the action of a spring. Thus, when the drive spindle is lowered, the projecting end of the resilient accelerating shaft abuts against the clutch part of the work spindle and, by such frictional engagement, propels and accelerates the same until both spindles are running synchronously when the two parts of the clutch are finally permitted to engage. Consequently, the engagement of the clutch is immediately positive, quiet, smooth, and without jarring.

Another feature of the invention consists in providing a suitable locking mechanism intermediate the upper and lower sections of the turret head for retaining the lower section in a position in which the centering mechanism of the clutch automatically adjusts the work spindle to its proper position coaxially with the drive spindle. For this purpose, the locking mechanism according to the invention roughly consists of a spring actuated lever provided in the upper section of the turret head which cooperates with a suitable stop on the lower section, a stop releasing groove underneath such stop, and a second stop at the end of such groove.

Further objects, features, and advantages of the invention will appear from the following detailed description of one preferred embodiment thereof and the appended drawings, in which Fig. 1 shows a vertical section through a turret head according to the invention;

Fig. 5 shows a section through a tool head provided with a speed changing gear; while

Figures 1, 2, 3:
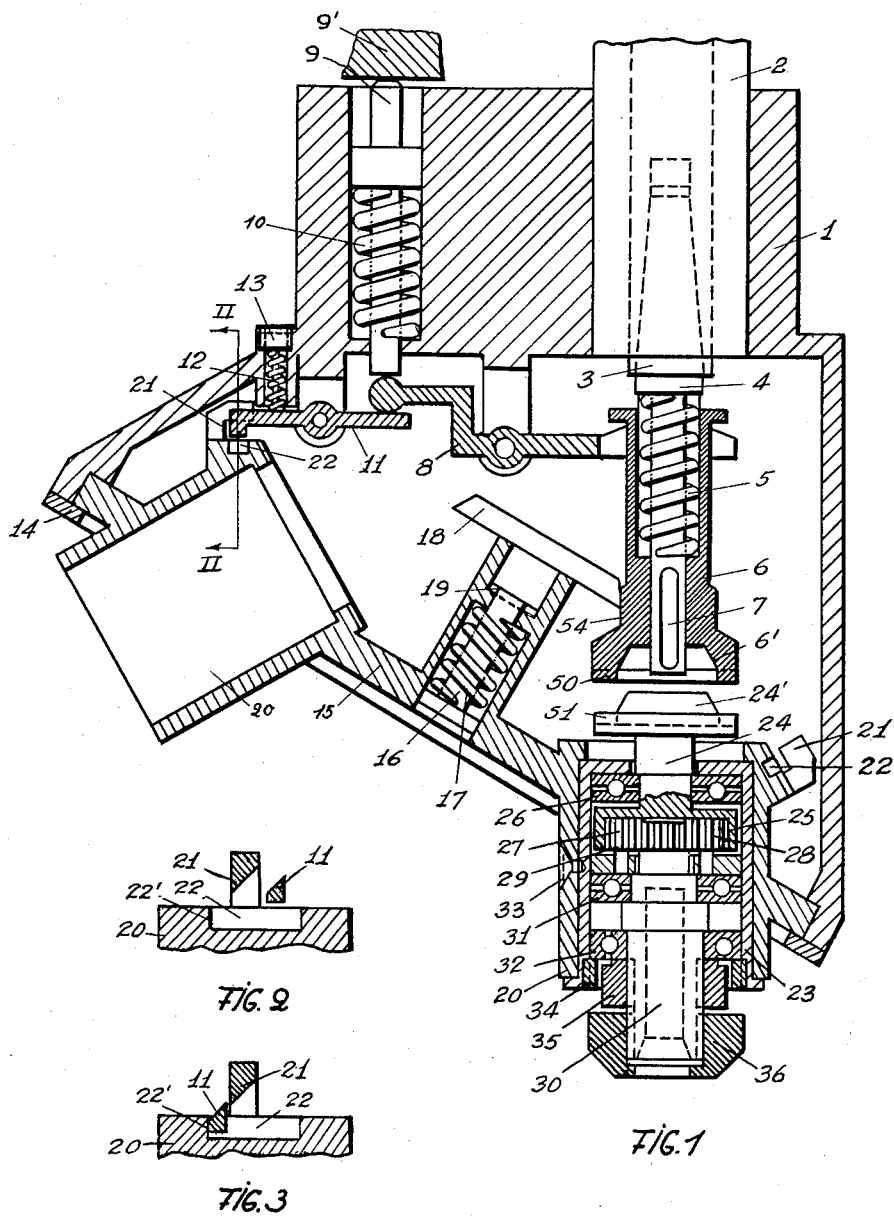
Fig. 2 shows a section through the locking mechanism taken along line II—II of Fig. 1.
Fig. 3 shows the same section after the engagement of the locking lever.

Referring to Fig. 1, the turret head consists of an upper section 1 forming a casing which is preferably connected to the spindle sleeve 2 of the drill press or similar machine so as to be easily removed therefrom. The main spindle 3 of the machine has mounted thereon a driving or centering shaft 4. The lower cylindrical part of the shaft 4 carries a compression spring 5 and a driving element 6 which is longitudinally slidable on the shaft 4 and secured against rotation by a key 7. The casing 1 also has pivotally mounted therein a control lever 8, one bifurcated end of which engages with the lower surface of a shoulder on the driving element 6, while the other end thereof rests against the lower end of a tripping pin 9 which carries a compression spring 10. The casing 1 has further pivotally mounted therein a locking lever 11, one end of which is acted upon by the control lever 8, while the other end, which preferably has a small nose thereon, is acted upon by a compression spring 12 which is held and may be tightened by a screw 13.

The lower portion of the casing 1 is of conical shape and open toward the bottom into which a platelike cover 15 is fitted from below and held therein by a suitable retaining ring 14, such as a bayonet ring or the like, so as to be freely rotatable relative to the casing 1. A driving bolt 16 with a compression spring 17 thereon is resiliently mounted at the center of the cover plate 15 and carries at its upper end a friction disk 18 and, intermediate the driving bolt 16 and the cover plate 15, a clutch 19 which may consist, for example, of suitable cam surfaces or clutch teeth.

The cover plate 15 also has fixedly secured thereto a plurality of sockets 20 which are axially inclined relative to the plate 15, the degree of such inclination depending upon the particular angle of the plate 15 relative to the axis of the main driving spindle 3 of the machine, so that, when the plate 15 is turned a sufficient amount, one or the other socket will assume the position shown at the right side of Fig. 1, that is, coaxially with the main spindle 3 and the driving shaft 4. Each of the sockets 20 is provided with a stop 21 for the locking lever 11, and directly below such stop 21 each socket 20 has an aperture or groove 22. As shown particularly in Figs. 2 and 3, the contacting surfaces of both the lever 11 and the stop 21 are inclined so as to permit easier sliding along each other, and the lower edge of the stop 21 is spaced from the groove 22 to permit the lever 11 to slide underneath stop 21 when the lower section 15 of the turret head is rotated, until finally it comes to rest against the end wall 22' of the groove 22. Also, as to be seen in Figs. 2 and 3, the length of the groove 22 is such that, when the lever 11 abuts against the end wall 22' thereof, it is fully below and behind the stop 21, thus permitting it to pivot upwardly and out of the groove 22 when the lower section 15 is rotated to move the next socket underneath the drive spindle 3 and the driving element 6, as will be later described in detail.

The tool head illustrated in Fig. 1 is provided with a planetary speed increasing gear and consists of a casing 23 in which a driven shaft 24 with a self-centering head 24', which is adapted to engage with, and to be locked to, the lower end 6' of the driving shaft 6, is mounted by means of ball bearing 26. The driven shaft 24 carries an internal gear 25 which engages with intermediate gears 27 and 28. These gears, in turn, engage with a pinion 29 which is fixedly mounted on a work spindle 30 which is supported by ball bearings 31 and 32 in the casing 23. The entire tool head is fitted and locked within one of the sockets 20 by means of a screw 33 connecting the socket with the casing 23, while the parts contained within the casing 23 are secured therein by two nuts 34 and 35 which are threaded within the lower end of the casing 23 and on the work spindle 30, respectively. A suitable cap nut 36 or the like on the lower end of the spindle 30 serves to secure the respective tool therein.

Figure 4:
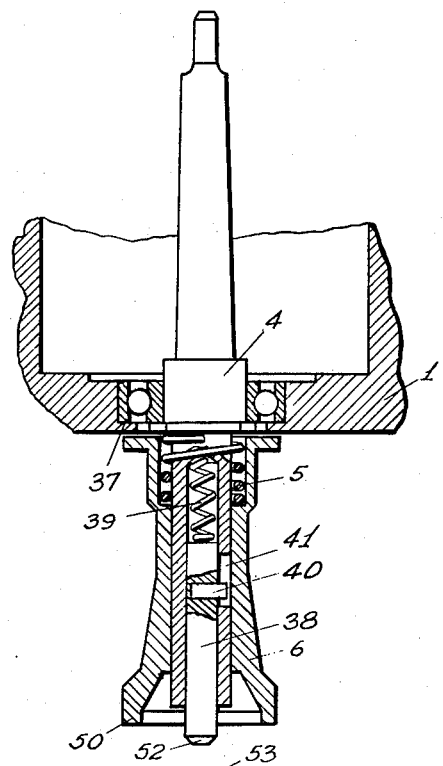
Fig. 4 shows a fractional vertical section through a modified design of the upper section of the turret head and the accelerating shaft.

In the modified form of the driving and centering shaft 4, as shown in Fig. 4, the latter is mounted and centered within the casing 1 by means of a bearing 37. A rod 38 is mounted within a central bore of the shaft 4 so as to be slidable in axial direction thereof against the action of a spring 39, and locked against rotation by a pin 40 which slides in a slot 41 provided in the driving and centering shaft 4.

Figure 5:
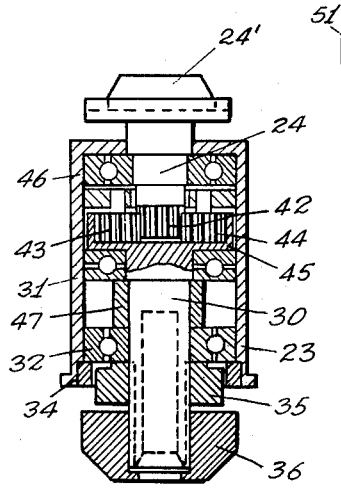

Fig. 5 illustrates a tool head according to another embodiment of the invention, which is provided with a speed reduction gear. For this purpose, the driven shaft 24 with the self-centering head 24' thereon has fixed thereon a pinion 42 which engages with gears 43 and 44 which, in turn, engage with an internal gear 45 which is fixed on the tool spindle 30. The driven shaft 24 is rotatably mounted in a bearing 46, while the tool spindle 30 is mounted by roller bearings 31 and 32 secured to the casing 23 and spaced apart by a spacing ring 47. The various elements of the tool head are secured within the casing 23 in a similar manner as shown in Fig. 1 by nuts 34 and 35, and the tool spindle 30 is likewise provided with a cap nut or the like for securing the respective tool therein.

Figure 6:
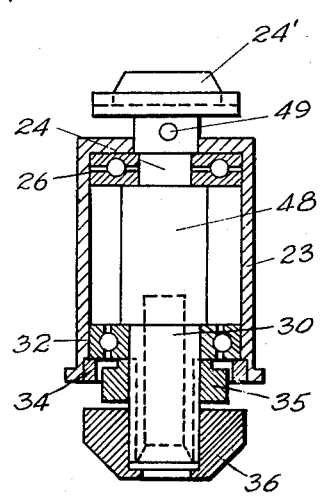
Fig. 6 shows a similar section through a tool head without a gear.

Fig. 6 illustrates a tool head according to still another embodiment of the invention, wherein the driving shaft 24 with the self-centering head 24' thereon is directly connected with the tool spindle 30 by means of an intermediate part 48 and is locked thereto by a pin 49. Both parts are again rotatably supported by ball bearings 26 and 32 within the casing 23 and secured by nuts 34 and 35.

In operation, the tool heads according to the invention are first inserted according to their particular use and order of use into the sockets 20 in the lower part 15 of the turret head and there locked in position by screws 33. Although any number of tool heads may be inserted and used, depending only upon the number of sockets provided in the lower part 15, generally speaking, three to six sockets 20 will suffice for most purposes. According to the invention, it is not only possible to exchange the individual tool heads whenever desired and to insert others in the respective sockets 20, but the lower section 15 may be easily exchanged for one of a different type, that is, for example, with a larger or smaller number or a different kind or size of sockets. For this purpose, the retaining ring 14 is preferably secured to the casing 1 by a quick-change coupling, such as, for example, a bayonet lock, a socket lock, or the like, so as to permit a quick exchange of one lower section 15 for another.

After inserting and locking the respective tool heads in the wanted order of succession to the lower section 15, the upper section 1 of the turret head is placed upon the spindle sleeve 2 of a drill press or similar machine and secured thereto by suitable clamping means not shown in the drawings, the driving or centering shaft 4 then being inserted in the machine spindle 3 and held therein by a standard cone or similar means.

When the drill press or similar machine is switched on, the main spindle 3 first rotates the driving and centering spindle 4 and the driving element. When lowering the main spindle 3 together with the spindle sleeve 2 and the casing 2 thereon, the lower centering part 6' of the driving element 6 connects with the corresponding centering head 24' of the driven shaft 24 so as to center the work spindle 30 relative thereto and to drive the same by means of one or more interlocking cams or teeth 50 and 51 on the lower and upper surfaces of the parts 6' and 24', respectively.

If the modified form of the driving and centering shaft 4, as shown in Fig. 4, is applied and the machine spindle 3 is lowered, first the end portion 52 of the accelerating rod 38, which is preferably of a conical shape, is forced into a corresponding inner cone 53 on the driven shaft 24 and, through the friction developed between the surfaces of these parts, transmits the rotary movement thereto. When the machine spindle 3 is further lowered, the rod 38 is more and more deeply forced into the bore in the driving shaft 4 against the action of the spring 39 until finally the driving cams or teeth 50 and 51 engage each other without noise.

After completing one operation and during the upward movement of the spindle sleeve 2 together with the respective tool head, the upwardly projecting end of the tripping pin 9 presses against a portion 9' of the drill press or similar machine, or against a suitable stop thereon, and is thereby depressed against the action of the compression spring 10 so as to act upon the control lever 8 to lift the driving element 6. Hereby the spring 5 is compressed and the interlocking elements 50 and 51 on the parts 6' and 24', respectively, are disengaged so that the work spindle 30 is no longer connected to and driven by the main spindle 3. Simultaneously herewith, the control lever 8 acts upon one end of the locking lever 11 so as to lift the other end thereof out of the respective notch or groove 22 which is provided in the lower section 15 diametrically opposite to each work spindle 30. This moves the locking lever 11 behind the stop 21 and above the groove 22. Simultaneously herewith, the surface 54 on the driving element 6 slides along the face of the friction disk 18 so as to rotate the same, thereby also rotating the lower section 15 together with the tool heads by means of the clutch 19 until the locking lever 11 abuts against the next stop 21, thus preventing any further rotary movement of the lower section 15 until the spindle sleeve 2 is again lowered. Thus, as long as the locking lever 11 rests against the stop 21, the friction disk 18 only idles since the clutch 19 is released.

When the spindle sleeve 2 moves downwardly together with the upper section 1 of the turret head, the compression spring 10 forces the tripping pin 9 upwardly and the latter thus frees the locking lever 11 which through the action of the compression spring 12 drops into the groove 22 below the stop 21. Simultaneously herewith, the lower section 15 of the turret head proceeds to move until the next work spindle 30 is below and coaxially with the machine spindle 3. The rotary movement of the lower section 15 together with the tool heads is limited by the nose of the locking lever 11 coming to rest against the end wall 22' of the groove 22. As soon as the control lever 8 has completely freed the driving element 6, the compression spring 5 pushes the latter over and upon the head 24' of the driven shaft 24 of the tool head and thus transmits the driving motion to the work spindle 30. This procedure as above described is repeated at every change of the work cycle.

The lower section 15 of the turret head together with the tool heads may, if desired, also be turned manually. For this purpose, however, the tripping pin 9 must first be depressed to disengage the nose of the locking lever 11 from the groove 22.

Thus, the entire work cycle of the turret head according to the invention is as follows:

1. When the drive spindle and the turret casing are in raised position, the lower section is turned by the friction disk 18 until the lever 11 hits on the stop 21 which, despite the inclined surfaces of lever 11 and stop 21 and the spring 12, cannot tilt downwardly because of pin 9 abutting on the machine part 9' and thus not releasing the lever 11. The movement of the lower section is therefore completely stopped and the clutch 19 disengaged so that the friction disk 18 merely idles.

2. When the drive spindle and the turret casing are lowered and moved away from the machine part 9', spring 10 lifts the pin 9 and the upper shoulder on the driving element 6 pivots the lever 8, thereby releasing lever 11 which, under the action of spring 12, slides down into the groove 22 and below the stop 21, thus permitting the lower section 15 to rotate a small distance until lever 11 hits the end wall 22' of groove 22. Such rotary movement from the stop 21 to the end wall 22' of groove 22 permits centering of the tool head relative to the drive spindle by the conical surfaces 6' and 24'. As soon as the clutch 50, 51 is engaged, disk 18 is disengaged from the surface 54, while the lever 11 on the end wall 22' of the groove 22 locks the lower section 15 against further movement.

3. When the drive spindle with the turret casing are again raised, pin 9 abuts on the machine part 9', lever 8 pulls the driving element 6 upwardly and out of engagement with clutch part 24'. Simultaneously, disk 18 starts riding on the surface 54 of the driving element 6 and to be driven thereby and, lever 11 is lifted out of groove 22, permitting the lower section 15 to rotate until lever 11 hits on the next stop 21.

While I have described my invention with reference to a preferred embodiment thereof, I wish it to be understood that my invention is in no way limited to the details of such embodiment but is capable of numerous modifications within the scope of the appended claims.

What I claim is:

1. In combination with a drill press or similar machine having a rotating spindle and means for reciprocating said spindle in axial direction thereof, a turret head comprising an upper section forming a housing, means for connecting said housing to said spindle so as to be non-rotatable relative thereto, a lower section, means for rotatably mounting said lower section on said housing at an inclined angle relative to the axis of said spindle, means connected to said spindle for turning said lower section, means for rotatably mounting a plurality of tools in said lower section, means for alternately connecting one of said tool mounting means to said spindle when said lower section is turned to a position wherein said tool mounting means is located in axial direction of said spindle, means for automatically locking and unlocking said lower section comprising a stop on the lower section for each of said tool mounting means, a lever mounted on said housing and adapted to engage one of said stops when said spindle is in a raised position and disengaged from said tool mounting means, said lever adapted to be pivoted by said spindle when said spindle is lowered so as to disengage said lever from said stop to permit said lower section to rotate until it arrives in said position coaxially with said spindle, and a second stop, said lever adapted to engage said second stop when said lower section has arrived in said position and said spindle has been engaged with said tool mounting means so as to drive the same.

2. In combination with a drill press or similar machine having a rotating spindle and means for reciprocating said spindle in axial direction thereof, a turret head comprising an upper section forming a housing, means for connecting said housing to said spindle so as to be non-rotatable relative thereto, a lower section, means for rotatably mounting said lower section on said housing at an inclined angle relative to the axis of said spindle, means connected to said spindle for turning said lower section, means for rotatably mounting a plurality of tools is said lower section, means for alternately connecting one of said tool mounting means to said spindle when said lower section is turned to a position wherein said tool mounting means is located in axial direction of said spindle, means for automatically locking and unlocking said lower section comprising a stop on the lower section for each of said tool mounting means, a lever mounted on said housing and adapted to engage one of said stops when said spindle is in a raised position and disengaged from said tool mounting means, said lever adapted to be pivoted by said spindle when said spindle is lowered so as to disengage said lever from said stop to permit said lower section to rotate until it arrives in said position coaxially with said spindle, and a second stop, said lever adapted to engage said second stop when said lower section has arrived in said position and said spindle has been engaged with said tool mounting means so as to drive the same, and means for automatically disconnecting said turning means for the lower section from said spindle when said spindle is engaged with said tool mounting means.

3. In combination with a drill press or similar machine having a rotating spindle and means for reciprocating said spindle in axial direction of said spindle, a turret head comprising an upper section forming a housing, means for connecting said housing to said spindle so as to be non-rotatable relative thereto, a lower section, means for rotatably mounting said lower section on said housing at an inclined angle relative to the axis of said spindle, means connected to said spindle for turning said lower section, means for rotatably mounting a plurality of tools in said lower section, means for alternately connecting one of said tool mounting means to said spindle when said lower section is turned to a position wherein said tool mounting means is located in axial direction of said spindle, means for automatically locking and unlocking said lower section comprising a stop on the lower section for each of said tool mounting means, a lever mounted on said housing and adapted to engage one of said stops when said spindle is in a raised position and disengaged from said tool mounting means, said lever adapted to be pivoted by said spindle when said spindle is lowered so as to disengage said lever from said stop to permit said lower section to rotate until it arrives in said position coaxially with said spindle, and a second stop, said lever adapted to engage said second stop when said lower section has arrived in said position and said spindle has been engaged with said tool mounting means so as to drive the same, means for automatically disconnecting said turning means for the lower section from said spindle when said spindle is engaged with said tool mounting means, and further means for automatically unlocking said lower section when said spindle is raised, said last means comprising means for disengaging said lever from said second stop.

4. In combination with a drill press or similar machine having a rotating spindle and means for reciprocating said spindle in axial direction thereof, a turret head comprising an upper section forming a housing, means for connecting said housing to said spindle so as to be non-rotatable relative thereto, a lower section, means for rotatably mounting said lower section on said housing at an inclined angle relative to the axis of said spindle, means connected to said spindle for turning said lower section, means for rotatably mounting a plurality of tools in said lower section, means for alternately connecting one of said tool mounting means to said spindle when said lower section is turned to a position wherein said tool mounting means is located in axial direction of said spindle, means for automatically locking and unlocking said lower section comprising a stop on the lower section for each of said tool mounting means, a member mounted on said housing and adapted to engage one of said stops when said spindle is in a raised position and disengaged from said tool mounting means, said member adapted to be moved by said spindle when said spindle is lowered so as to disengage said member from said stop to permit said lower section to turn until it arrives in said position coaxially with said spindle, and a second stop, said member adapted to engage said second stop when said lower section has arrived in said position and said spindle has been engaged with said tool mounting means so as to drive the same.

5. In combination machine having a rotating spindle and means for reciprocating said spindle in axial direction thereof, a turret head comprising an upper section forming a housing, means for connecting said housing to said spindle so as to be non-rotatable relative thereto, a lower section, means for rotatably mounting said lower section on said housing, means for turning said lower section, means for mounting a plurality of tools in said lower section, means for alternately connecting one of said tool mounting means to said spindle when said lower section is turned to a position wherein said tool mounting means is located in axial direction of said spindle, means for automatically locking and unlocking said lower section comprising a stop on the lower section for each of said tool mounting means, a member mounted on said housing and adapted to engage one of said stops when said spindle is in a raised position and disengaged from said tool mounting means, said member adapted to be moved by said spindle when said spindle is lowered so as to disengage said member from said stop to permit said lower section to turn until it arrives in said position coaxially with said spindle, and a second stop, said member adapted to engage said second stop when said lower section has arrived in said position and said spindle has been engaged with said tool mounting means so as to drive the same.

6. In combination machine having a drive spindle and means for reciprocating said spindle in axial direction thereof, a turret head comprising an upper section forming a housing, means for connecting said housing to said spindle so as to be non-rotatable relative thereto, a supporting means, means for rotatably mounting said supporting means on said housing, means for turning said supporting means, means for mounting a plurality of tools in said supporting means, means for alternately connecting one of said tool mounting means to said spindle when said supporting means is turned to a position wherein said tool mounting means is located in axial direction of said spindle, means for automatically locking and unlocking said supporting means comprising a stop on the supporting means for each of said tool mounting means, a member mounted on said housing and adapted to engage one of said stops when said spindle is in one axially shifted position and disengaged from said tool mounting means, said member adapted to be moved by said spindle when said spindle is in another axially shifted position so as to disengage said member from said stop to permit said supporting means to turn until it arrives in said position coaxially with said spindle, and a second stop, said member adapted to engage said second stop when said supporting means has arrived in said position and said spindle has been engaged with said tool mounting means so as to drive the same.

References Cited in the file of this patent

UNITED STATES PATENTS

| | | |
|---|---|---|
| 336,598 | Smith | Feb. 23, 1886 |
| 2,491,859 | Hijmans | Dec. 20, 1949 |
| 2,544,617 | Shankweiler | Mar. 6, 1951 |